Patented Sept. 9, 1930

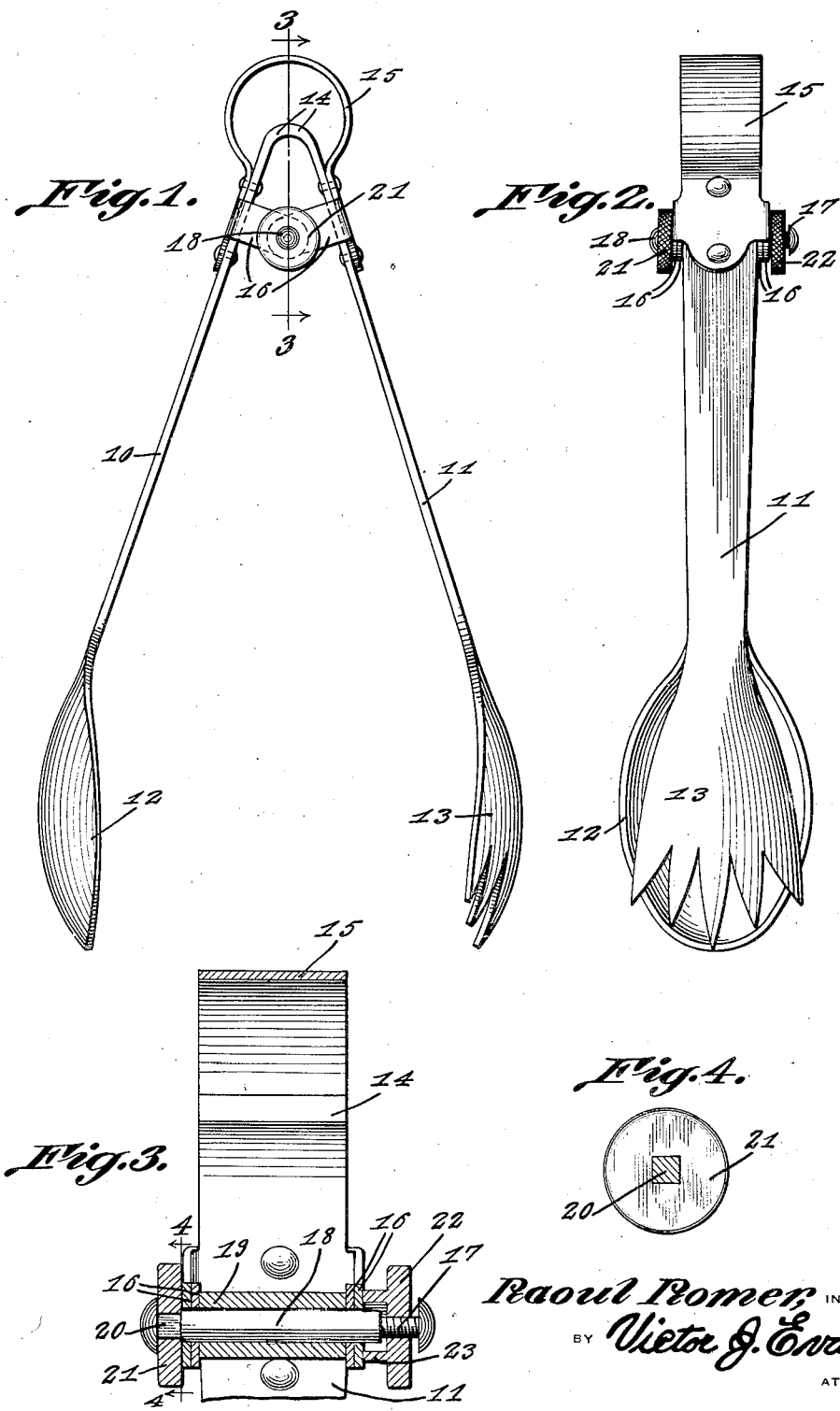

1,775,571

UNITED STATES PATENT OFFICE

RAOUL ROMER, OF BADEN, SWITZERLAND

SALAD-SERVING IMPLEMENT

Application filed February 8, 1930. Serial No. 426,972.

This invention relates to certain new and useful improvements in severing implements having particular application to the culinary art and designed for the serving or dispensing of salads and the like.

An object of the invention contemplates the provision and arrangement of a combination implement embodying the characteristics of a fork and spoon.

Another object of the invention consists of a connecting element for the implements yieldingly inducing the working ends thereof to occupy positions spaced apart.

An additional object of the invention contemplates the arrangement of a pivot connection for the shanks or handle portions of the implements from which same may swing while in use.

More specifically stated the pivot connection for the implements is provided with a locking mechanism whereby the implements may be maintained in closed position for storage.

With the above and other objects in view, the invention further consists of the following novel features and details of construction, to be hereinafter more fully described, illustrated in the accompanying drawing and pointed out in the appended claims.

In the drawing:—

Figure 1 is a side elevation of the present invention.

Figure 2 is an elevation of the invention taken at right angles to Figure 1.

Figure 3 is a sectional view taken on line 3—3 of Figure 1.

Figure 4 is a sectional view taken on line 4—4 of Figure 3.

Referring to the drawing in detail wherein like characters of reference denote corresponding parts, the reference characters 10 and 11 respectively indicate the handles or shanks of a spoon 12 and a combination spoon and fork 13. The remaining extremities of the shanks or handles terminate to provide inwardly curved portions 14 designed for abutting engagement when disposed in the Figure 1 position.

A connecting element, such as indicated at 15, and secured at its ends upon the outer sides of the handles 10 and 11 adjacent the outer sides of the handles 10 and 11 adjacent the curved extremities 14 of the latter, is bent upon itself over the curved extremities to exercise yielding tension upon said handles to normally dispose same in the Figure 1 position whereby the tools or implements 12 and 13 will be normally spaced apart.

Ears 16, right angularly offset upon the side edges of the attaching portions of the connecting element 15, are disposed terminally thereof in overlapping relation and apertured to accommodate a common tubular member 18. A spacing sleeve or element, such as indicated at 19, telescopically associated with the sleeve member 18, is designed to abut the innermost sides of the adjacent overlapping ears in the manner suggested in Figure 3 of the drawing. The sleeve member 18 is provided at one end with a squared portion 20 upon which is mounted a disk member 21 lying flush against the outer surface of one of the ears 16 for frictional locking connection therewith. A disk member 22, constructed after the manner of the disk 21, is provided with an annular ring 23 upon the inner side thereof and abutting the remaining of the outermost overlapping ears peripherally thereof. The space or pocket defined by the ring 23 between the disk 22 and the immediate ear is utilized for the purpose of effecting the connection between the tubular member 18 and a threaded shank 17. The shank 17, when threaded to its maximum extent within the tubular member 18 will cause the head therefor to engage the outer surface of the disk 22 and cause the periphery of the ring 23 to frictionally engage the adjacent portions of the ears 16 whereby the shanks or handle portions 10 and 11 for the tools or implements 12 and 13 will be lockingly retained in position.

Under ordinary circumstances, the shank 17 is backed off to occupy the Figure 3 position whereby the handle portions or shanks of the implements may be operated well against the tension exercised thereon by the connecting element 15.

It is believed that the present invention will prove most effective for the purpose of dispensing and serving salads in view of the fact that the invention offers the advantage of serving same either saturated with the juice or oil used with the salad or the combined implement 13 by reason of its being provided with prongs or tines will facilitate drainage of the oil or juice from the salad, in accordance with the desire and taste of the user.

The invention is susceptible of various changes in its form, proportions and minor details of construction, and the right is herein reserved to make such changes as properly fall within the scope of the appended claims.

Having described the invention, what is claimed is:—

1. A serving implement comprising companion shanks having spoon and fork shaped portions respectively, the opposite ends of the shanks being inwardly curved and disposed in abutting engagement, a spring connecting element joined at its ends with said shank normally disposing the working ends of the shanks spaced apart, ears carried by and extended from the attaching portions of the connecting element being disposed in overlapping relation, a locking element passed through the overlapping portions of the ears, an adjusting element for the locking element, and disk members carried by the locking element and adjusting element respectively having frictional locking connection with said ears.

2. A serving implement comprising companion shanks having spoon and fork shaped portions respectively, the opposite ends of the shanks being inwardly curved and disposed in abutting engagement, a spring connecting element joined at its ends with said shanks normally disposing the working ends of the shanks spaced apart, ears carried by and extended from the attaching portions of the connecting element being disposed in overlapping relation, a locking element passed through the overlapping portions of the ears, an adjusting element for the locking element, a disk carried by the locking element frictionally engaging the outermost of the ears upon one side of the implement, and a disk carried by the adjusting element having a ring frictionally engaging the remaining of the outermost ears.

In testimony whereof I affix my signature.

RAOUL ROMER.